US006301602B1

(12) United States Patent
Ueki

(10) Patent No.: US 6,301,602 B1
(45) Date of Patent: Oct. 9, 2001

(54) PRIORITY INFORMATION DISPLAY SYSTEM

(75) Inventor: Katsuhiko Ueki, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 08/812,732

(22) Filed: Mar. 6, 1997

(30) Foreign Application Priority Data

Mar. 8, 1996 (JP) ........................................... 8-051139

(51) Int. Cl.[7] ........................................................ G06F 9/00
(52) U.S. Cl. ........................... 709/103; 709/100; 709/102
(58) Field of Search ..................................... 709/100, 101, 709/102, 103, 104, 105, 108, 316, 315; 714/38, 47; 713/201; 345/952, 956, 957, 967; 700/83, 87

(56) References Cited

U.S. PATENT DOCUMENTS 5,158,686  10/1992  Chastain et al. .

FOREIGN PATENT DOCUMENTS

0610581 A2 * 8/1994 (EP) .............................. G06F/15/72
7-110781      4/1995 (JP) .

OTHER PUBLICATIONS

"Priority Inheritance Protocols: An Approach to Real-Time Synchronization", Lui Sha et al, IEEE 1990.*

* cited by examiner

Primary Examiner—Majid Banankhah
(74) Attorney, Agent, or Firm—Banner & Witcoff, Ltd.

(57) ABSTRACT

A priority information display system operates on an operating system that controls the execution of a plurality of processes having their respective priorities and enables the inheritance of priority between the plurality of processes. The system acquires from the operating system the priority information including information on the inheritance of the priorities of processes. Furthermore, on the basis of the acquired priority information, the system creates information on the coordinates of the priorities of processes on a coordinate system consisting of three axes of a time axis, a process type axis, and a priority value axis, transforms the coordinate information into coordinate information on a three-dimensional display coordinate system, and displays lines representing the priorities of processes and the inheritance of priority three-dimensionally.

18 Claims, 10 Drawing Sheets

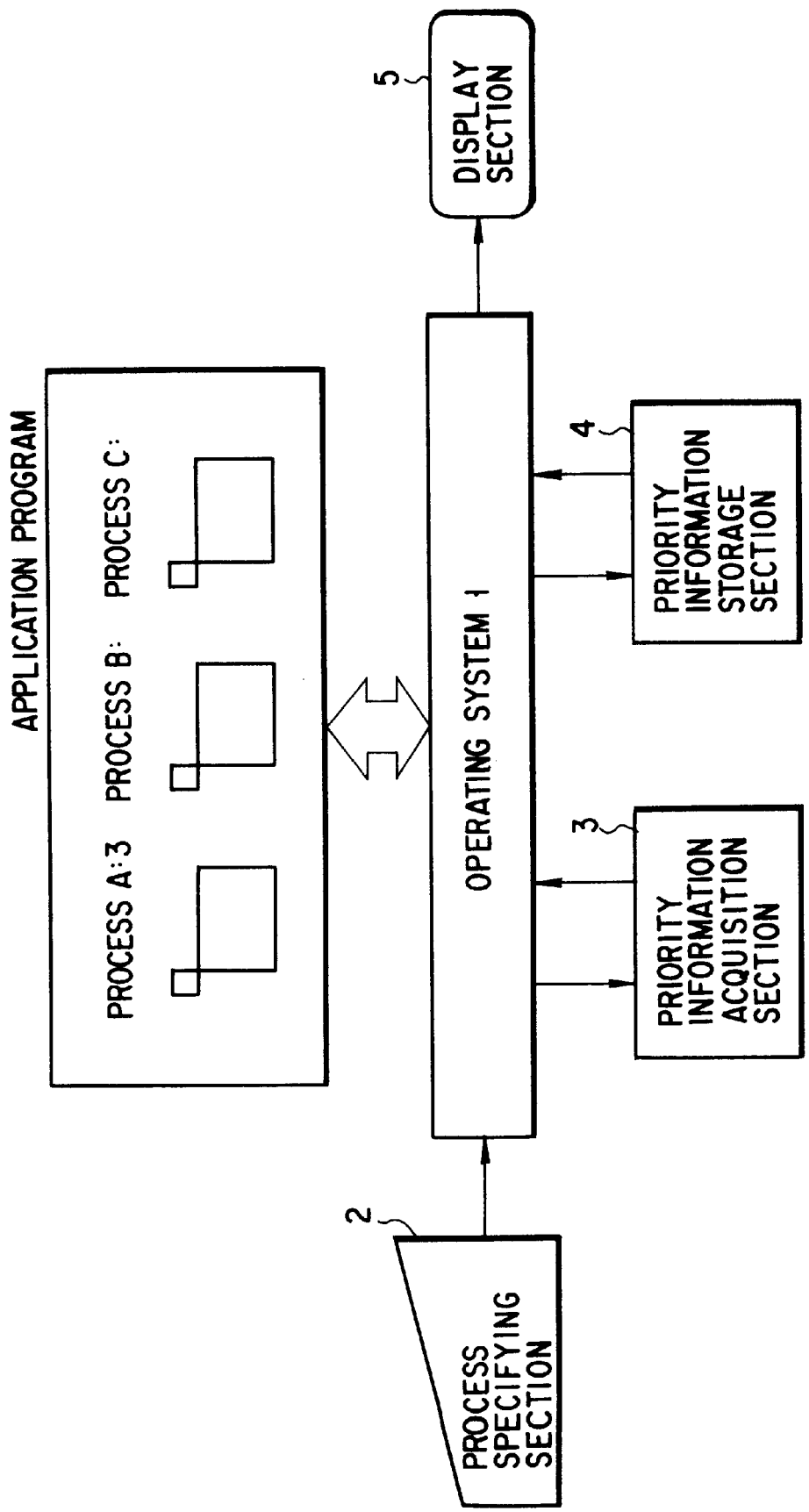
F I G. 1

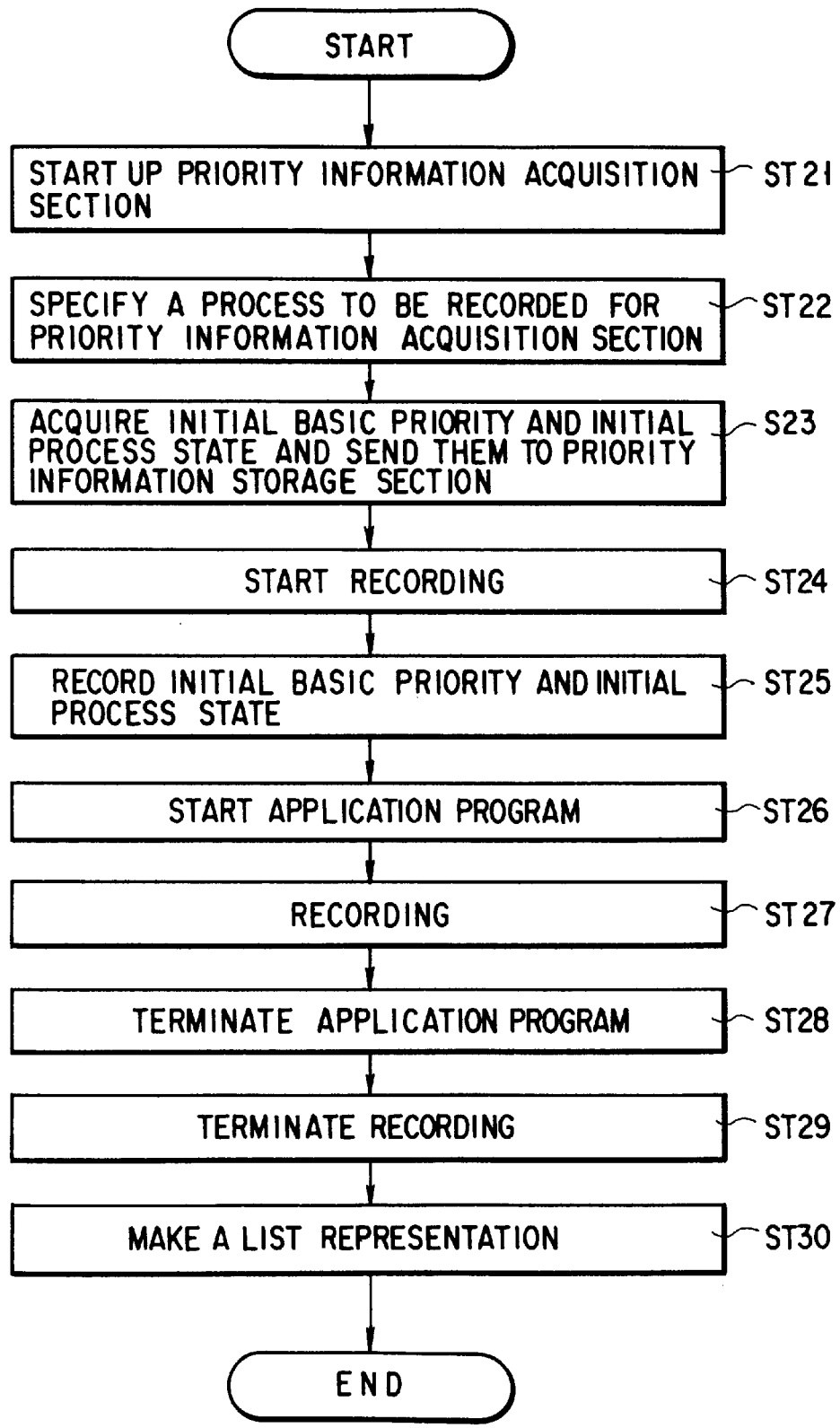
F I G. 2

| PROCESS IDENTIFIER | TYPE | DESCRIPTION | CAUSE |
|---|---|---|---|
| PROCESS A | INITIAL PROCESS STATE | WAIT | INITIAL |
| PROCESS B | INITIAL PROCESS STATE | READY | INITIAL |
| PROCESS C | INITIAL PROCESS STATE | READY | INITIAL |
| PROCESS A | INITIAL BASIC PRIORITY | 3 | INITIAL |
| PROCESS B | INITIAL BASIC PRIORITY | 4 | INITIAL |
| PROCESS C | INITIAL BASIC PRIORTY | 5 | INITIAL |

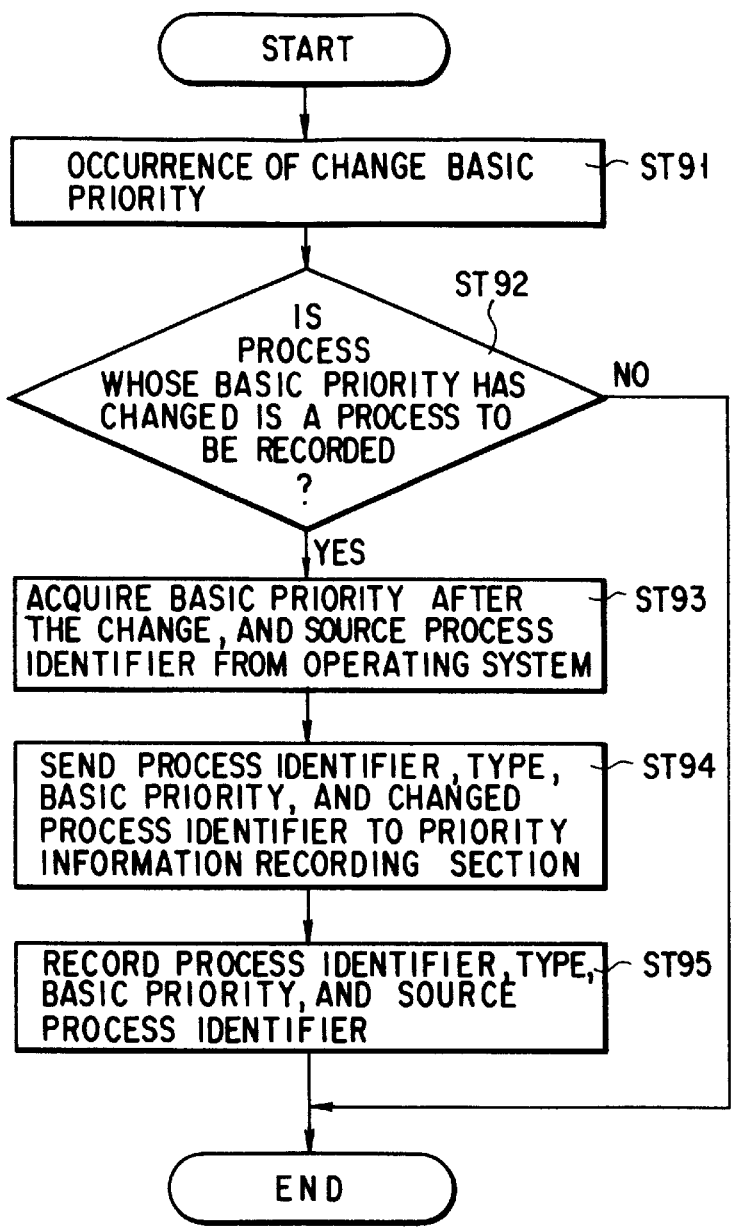

| No. | PROCESS IDENTIFIER | TYPE | DESCRIPTION | CAUSE |
|---|---|---|---|---|
| 1 | PROCESS A | INITIAL PROCESS STATE | WAIT | INITIAL |
| 2 | PROCESS B | INITIAL PROCESS STATE | READY | INITIAL |
| 3 | PROCESS C | INITIAL PROCESS STATE | READY | INITIAL |
| 4 | PROCESS A | INITIAL BASIC PRIORITY | 3 | INITIAL |
| 5 | PROCESS B | INITIAL BASIC PRIORITY | 4 | INITIAL |
| 6 | PROCESS C | INITIAL BASIC PRIORITY | 5 | INITIAL |
| 7 | PROCESS B | PROCESS STATE CHANGE | RUN | SCHEDULE |
| 8 | PROCESS A | PROCESS STATE CHANGE | READY | PROCESS B |
| 9 | PROCESS B | PROCESS STATE CHANGE | READY | SCHEDULE |
| 10 | PROCESS A | PROCESS STATE CHANGE | RUN | SCHEDULE |
| 11 | PROCESS B | BASIC PRIORITY CHANGE | 6 | PROCESS B |
| 12 | PROCESS A | PROCESS STATE CHANGE | WAIT | SEMAPHORE A |
| 13 | PROCESS B | PRIORITY INHERITANCE | 3 | PROCESS A |
| 14 | PROCESS B | PROCESS STATE CHANGE | RUN | SCHEDULE |
| 15 | PROCESS B | INHERITANCE CANCELLATION | — | SEMAPHORE A |
| 16 | PROCESS A | PROCESS STATE CHANGE | READY | PROCESS B |
| 17 | PROCESS B | PROCESS STATE CHANGE | READY | SCHEDULE |
| 18 | PROCESS A | PROCESS STATE CHANGE | RUN | SCHEDULE |

FIG. 13

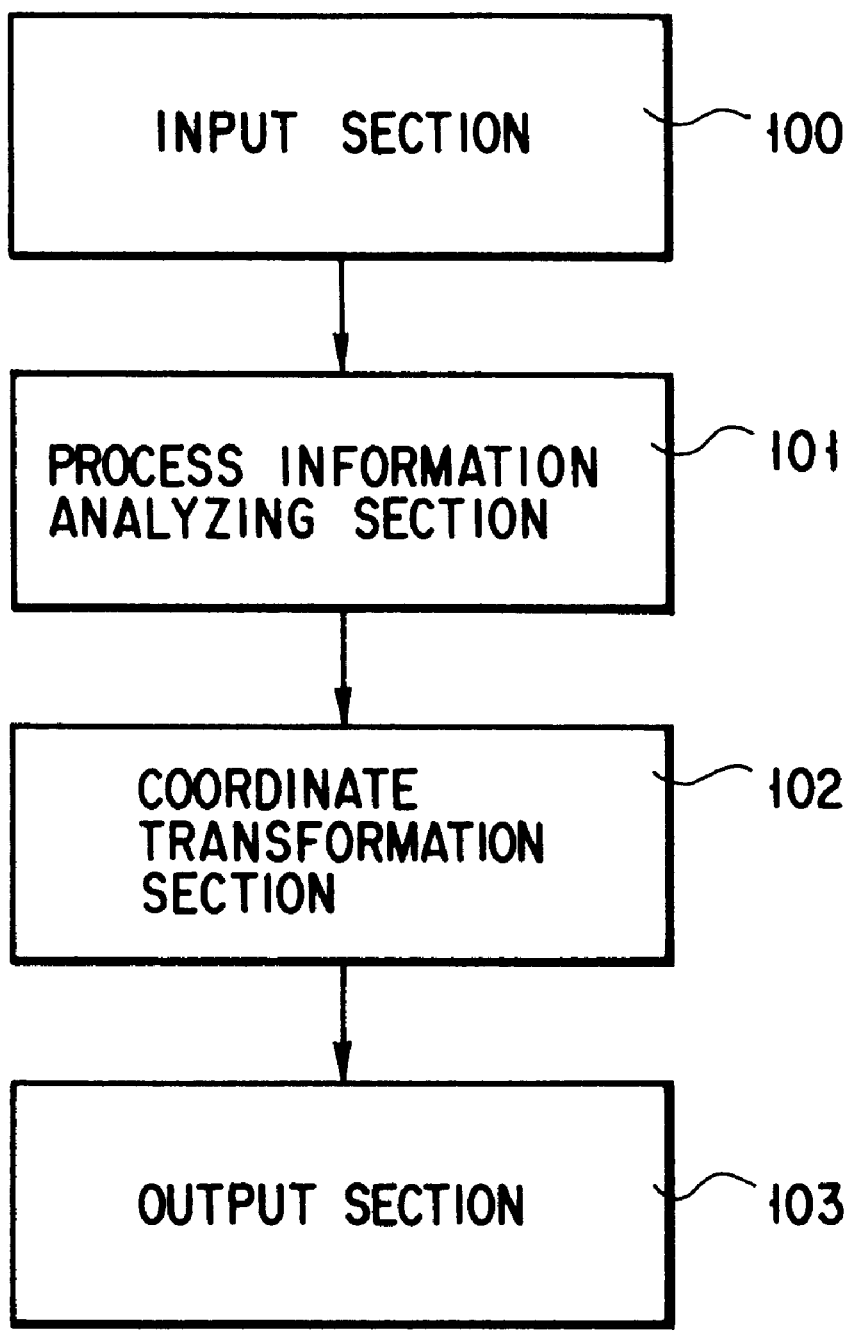
F I G. 14

PRIORITY INFORMATION DISPLAY SYSTEM

BACKGROUND OF THE INVENTION

This invention relates to a priority information display system that displays information on the priorities of processes effective in debugging, for example, a concurrent program.

In a concurrent-program execution environment, priority is generally set for units of concurrent operations, called tasks, processes, or objects, (hereinafter, referred to as "processes"). Priority is set for each process. Each process operates concurrently with other processes according to the scheduling from the operating system. As a general rule, in a specific operating system where priority is changed dynamically, the higher the priority of a process, the sooner the process will be executed.

In recent years, an operating system with a priority inheritance algorithm that causes a process to inherit the priority of another process has been provided. In priority inheritance by the algorithm, the present priority of the process that is to inherit priority is changed dynamically to the priority of the process from which the priority is inherited.

Explanation will be given, provided that a single process has a "initial basic priority", a "basic priority", and a "present priority". The "initial basis priority" means the value of priority given to a process in the initial stage and remains unchanged, as a general rule. The "basic priority" means the value of priority that changes only due to a specific factor (a specific system call) excluding the priority inheritance, as a general rule. The "present priority" means the value of priority that the operating system uses in scheduling, as a general a rule. The value of the present priority changes, depending on various factors including priority inheritance.

Some dynamic changes of priority are related to inheritance and other dynamic changes of priority are not related to inheritance. In the former case, that is, when dynamic changes of priority are related to inheritance, the factors triggering the change of priority include, for example, the issue of an interprocess synchronizing system call and the occurrence of an event, such as message exchange.

In the latter case, the change of the basic priority is taken as example.

A single process has "process states".

The "process states" mean the states of a process scheduled by the scheduler in the operating system.

Here, they indicate three states distinguished from each other by "Ready," "Wait," and "Run."

In the environment for debugging concurrent programs executed on the operating system using the priority inheritance algorithm, the desired program is debugged by recording the history of events occurred during the execution of the program and observing the behavior of the process.

The known methods of displaying information on priority, such as the current priority or the basic priority, include a method of recording the value of priority after the change at the time of issuing a priority change system call and a method of checking the priorities in unison with a specific timing. With these methods, however, the obtained priorities are only displayed in numerical values, which makes it impossible to display information on priority inheritance effectively.

BRIEF SUMMARY OF THE INVENTION

It is, accordingly, an object of the present invention to overcome the disadvantage in the prior art by providing the following priority information display systems:

(1) A priority information display system that displays information on priority effective in debugging concurrent programs or the like.

(2) A priority information display system that displays the priority information three-dimensionally so as to provide the user with the priority information effectively.

The foregoing objects are accomplished by providing a priority information display system which operates with an operating system that controls an execution of a plurality of processes having their respective priorities and enables an inheritance of priority between said processes, said priority information display system comprising:

acquisition means for acquiring from said operating system a priority information including information on the inheritance of the priorities between said processes; and display means for displaying said priority information acquired by said acquisition means.

According to the present invention, when a specific event related to the priorities of processes has taken place, not only specific process information on the event can be acquired and displayed, but also the behavior of processes, the change of priority, the cause of priority change, etc. can be recorded and displayed to the user, so that the user can easily find bugs or the like in the application program stemming from priority inheritance caused by an unexpected behavior of the process. Therefore, it is possible to provide a priority information display system that displays the program information effective in debugging the concurrent program.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a block diagram of the configuration of a priority display system according to the present invention;

FIG. 2 is a flowchart to help explain the flow of the recording process in the priority information acquisition section 3;

FIG. 9 is a flowchart of the basic priority changing process;

FIG. 10 shows an example of the pieces of priority information (basic priority change) recorded by the priority information recording section 4;

FIG. 13 illustrates an example of a list display of pieces of priority information;

FIG. 14 is a flowchart of the three-dimensional display process of priority information;

DETAILED DESCRIPTION OF THE INVENTION

Figures 3, 4:
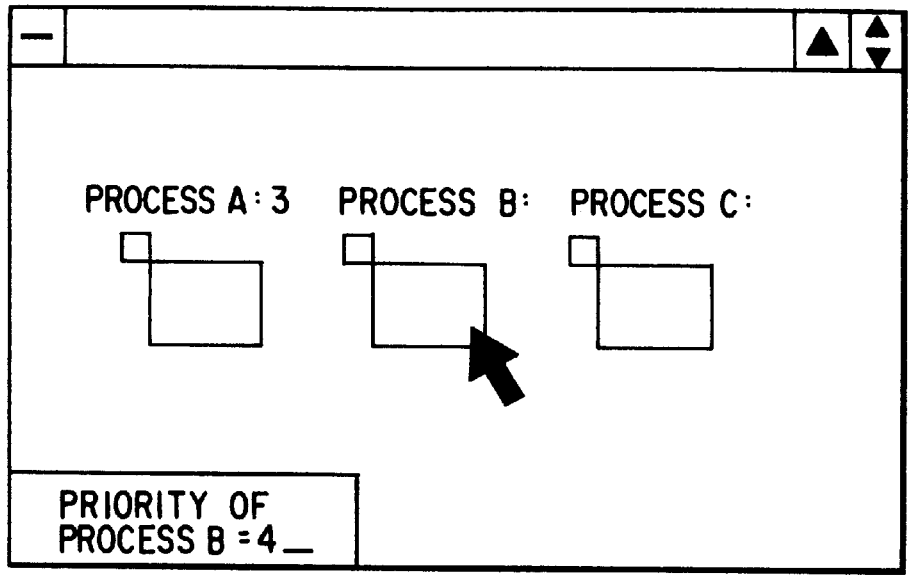
FIG. 3 illustrates an example of the screen that specifies a process to be recorded and the priority of the process.
FIG. 4 shows an example of the pieces of priority information recorded.

Hereinafter, referring to the accompanying drawings, embodiments of a priority information display system according to the present invention will be explained. In a first embodiment, a system that acquires information on the priorities of processes, including priority inheritance, from the operating system and displays a list of pieces of the priority information will be explained. In a second embodiment, a system that displays the priority information three-dimensionally.

(First Embodiment)

FIG. 1 is a block diagram of the configuration of a priority information display system according to the present invention. The priority information display system of the present invention comprises a process specifying section 2, a priority information acquisition section 3, a priority information recording section 4, and a display section 5, all of which are under the control of an operating system 1.

The operating system 1 used in the present invention controls the execution of a plurality of processes constituting an application program (a concurrent program) and intermediates between these processes and the input and output devices. One known operating system of this type is UNIX. Each process operates in a unique virtual address space in the computer system. Control of the execution of processes by the operating system means controlling the state of the processes, giving a suitable priority to each process, and thereby managing the order in which the processes will be executed.

The operating system 1 has a function related to the above-described priority inheritance algorithm. Namely, the operating system 1 enables the inheritance or cancellation of priority between a plurality of processes. There may be a case where the function is provided as an additional function of the operating system 1.

The process specifying section 2 is used for the user to specify a specific process, while seeing the display section 5, as described later.

The priority information acquisition section 3 holds the identifier for a process to be recorded that has been specified by the user and acquires from the operating system 1 information on the priority of the process, priority inheritance, and the change of the process state. According to the identifier for a process to be recorded, the section judges whether or not the acquired information is about the process to be recorded. If the information is about the process to be recorded, the section will send the acquired information to the priority information recording section 4.

Information (priority inheritance information) on a process related to priority inheritance includes the information used to let the user know that priority is inherited from a first process to a second process and that the priority given to the first process is canceled.

The priority information recording section 4 holds the specific pieces of information acquired by the priority information acquisition section 3. For example, it may be a file in a UNIX system or it may be held in the memory space.

The display section 5 displays the priority information etc. to the user on the basis of the specific information stored in the priority information recording section 4. The display section 5 also acts as the user interface for the user to specify a process.

Now, the operation of the priority information display system of the embodiment will be explained.

It is assumed that the application program (concurrent program) is made up of, for example, three processes, process A, process B, and process C, which operate cooperatively using a priority inheritance semaphore (not shown). Here, explanation will be given as to how process B inherits the priority of process A and operates.

FIG. 2 is a flowchart to help explain the flow of the recording process at the priority information acquisition section 3.

First, the user starts up the priority information acquisition section 3 to prepare to start the application program including the process to be recorded (ST 21).

It is assumed in the embodiment that process A, process B, and process C have been specified for processes to be recorded (ST22) and have been given priority levels 3, 4, and 5, respectively. FIG. 3 illustrate an example of the screen used to specify the processes to be recorded and the priorities of the processes. The figure shows that the user has finished setting process A and selected the icon corresponding to process B as a process to be recorded, thereby entering the initial priority. The name of the selected process to be recorded and the priority of the process are sent to the priority information acquisition section 3, which holds it.

The priority information acquisition section 3 acquires information on the priority of the process to be recorded and information on the state of the process (hereinafter, referred to as the "priority information") under the control of the operating system 1 and starts to record (ST23, ST24). The operating system 1 controls the execution of processes, while supervising the priorities of processes and their states, so it is possible to acquire the pieces of information by issuing a system call or the like to the operating system.

The priority information acquisition section 3 acquires the priorities of processes and their process states from the operating system 1 and records the priority information (ST25).

FIG. 4 shows an example of the pieces of priority information recorded. As shown in the figure, the priority information acquisition section 3 records pieces of priority information in the following fields: "PROCESS IDENTIFIER," "TYPE," "DESCRIPTION," and "CAUSE."

Then, the user starts up the application program including the processes to be recorded (ST26).

During the execution of the application program, the priority information on the processes to be recorded are recorded according to the occurrence of a specific event (ST27). After the application program has come to an end (ST28), the recording of the priority information is completed (ST29) and a list of the pieces of priority information recorded up to this point is displayed (ST30). The recorded priority information can be read and displayed whenever necessary at the request of the user.

In the embodiment, the priority information acquisition section 3 is started by the notice from a priority inheritance/priority change/process state change sensing program previously built in the operating system 1. The sensing program is provided as event sensing means for sensing specific events concerning the priorities of processes, including priority inheritance, priority cancellation, basic priority change, and an event related to process state change.

Next, explanation will be given about the flow of processing in a case where priority inheritance has occurred in the course of executing the application program.

Figures 5, 6:
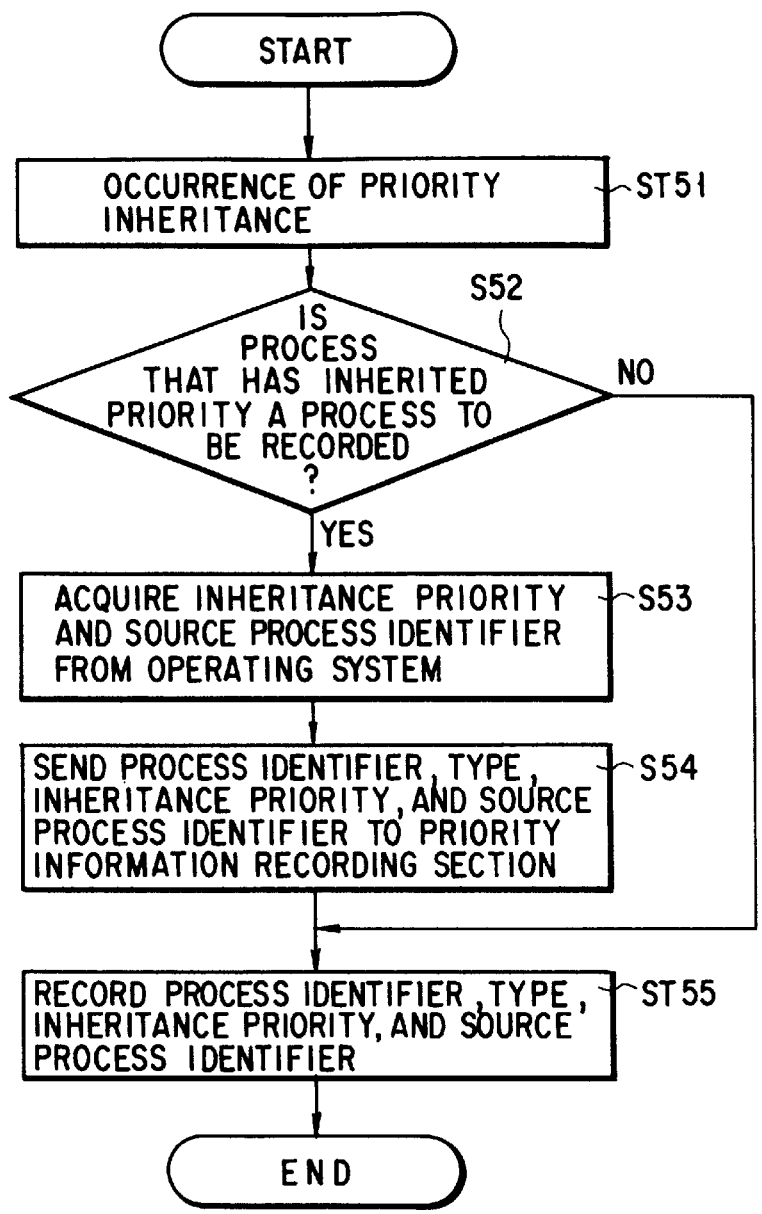
FIG. 5 is a flowchart to help explain the flow of processing at the time when priority inheritance has occurred.
FIG. 6 shows an example of the pieces of priority information (inheritance) recorded by the priority information recording section 4.

FIG. 5 is a flowchart to help explain the flow of processing at the time when priority inheritance has occurred.

When the inheritance of priority has taken place during the execution of the application program (ST51), the priority information acquisition section 3 judges whether or not the process that has inherited the priority is a process to be recorded (ST52). When having judged that the process that has inherited the priority is a process to be recorded, the priority information acquisition section 3 asks the operating system 1 about the inheritance priority and the identifier for the process (source process) from which the priority is inherited and acquires those pieces of information (ST53). Then, the priority information acquisition section 3 sends the inheritance priority information together with the process identifier and type of the process to be recorded to the priority information recording section 4 as inheritance priority information (ST54). The priority information recording section records the inheritance priority information (ST55).

FIG. 6 illustrates an example of the pieces of inheritance priority information recorded by the priority information recording section 4. The example of the figure shows that priority inheritance has occurred for process B (destination process) whose inheritance priority is 3 and the process that has inherited the priority is process A (source process).

Next, explanation will be given about the flow of processing in a case where the cancellation of priority inheritance has occurred during the execution of the application program.

Figures 7, 8:
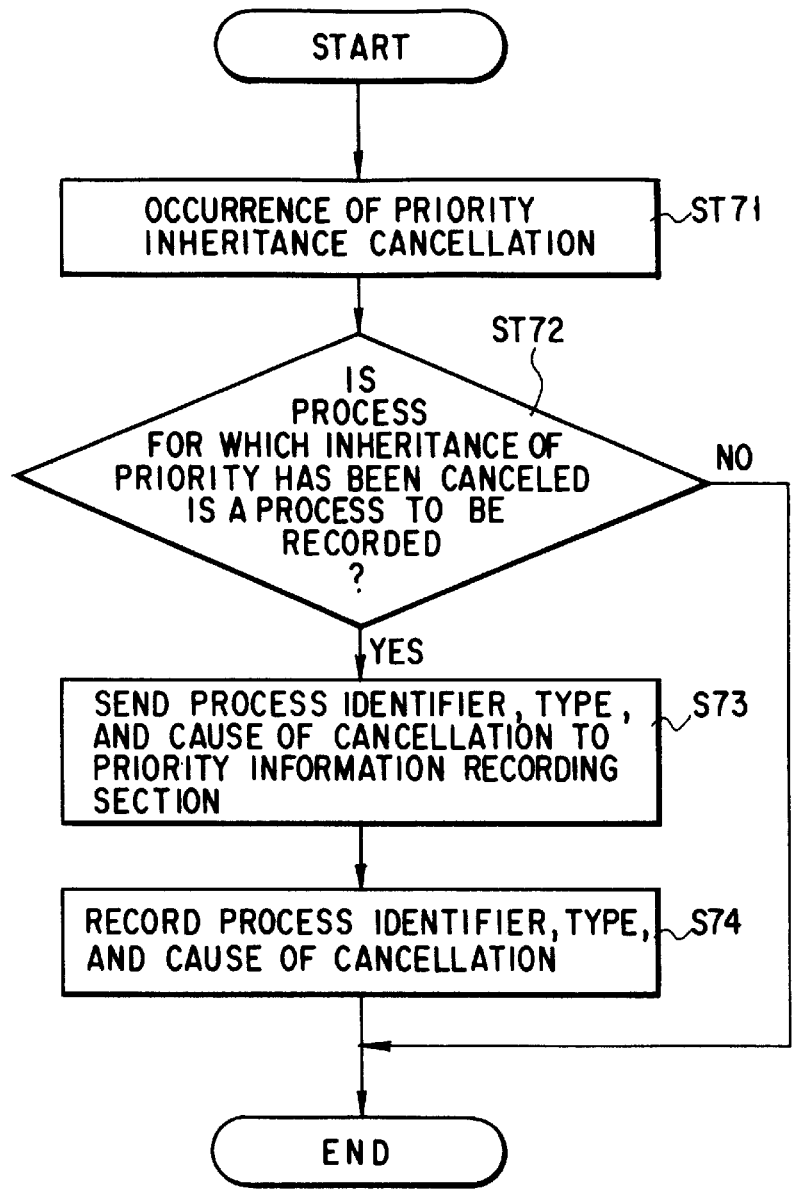
FIG. 7 is a flowchart to help explain the flow of the canceling process of priority inheritance.
FIG. 8 shows an example of the pieces of priority information (inheritance cancellation) recorded by the priority information recording section 4.

FIG. 7 is a flowchart to help explain the flow of canceling the priority inheritance.

When the cancellation of the priority inheritance has taken place during the execution of the application program (ST71), the priority information acquisition section 3 judges whether or not the process for which the cancellation has occurred is a process to be recorded (ST72). When having judged that the process for which the cancellation has occurred is a process to be recorded, the priority information acquisition section 3 acquires the process identifier and type (inheritance cancellation) of the process and information on the cause of the cancellation and sends these pieces of information to the priority information recording section 4 (ST73). The priority information recording section 4 records them (ST74).

FIG. 8 shows an example of pieces of information on the cancellation of the priority inheritance recorded by the priority information recording section 4. The example of the figure shows that the cancellation of the priority inheritance has occurred for process B and the cause of the cancellation has come from semaphore A.

Next, explanation will be given about a case where the change of the basic priority has taken place during the execution of the application program.

FIG. 9 is a flowchart for the process of changing the basic priority.

When the change of the basic priority has occurred during the execution of the application program (ST91), the priority information acquisition section 3 judges whether or not the process for which the change of the basic priority has occurred is a process to be recorded (ST92). When having judged that the process for which the change has occurred is a process to be recorded, the priority information acquisition section 3 acquires from the operating system the basic priority after the change and the identifier for the source process who has changed the basic priority (ST93) and sends these together with the process identifier and the type of information (i.e., basic priority change) to the priority information recording section 4 (ST94). The priority information recording section 4 records the sent information as information on the basic priority change (ST95).

FIG. 10 illustrates an example of the pieces of information on the basic priority change recorded by the priority information recording section 4. The example of the figure shows that the change of priority has taken place for process B and the priority of process B has been changed to basic priority 6 specified by process C.

Next, explanation will be given about a case where the change of the process state has occurred during the execution of the application program.

Figures 11, 12:
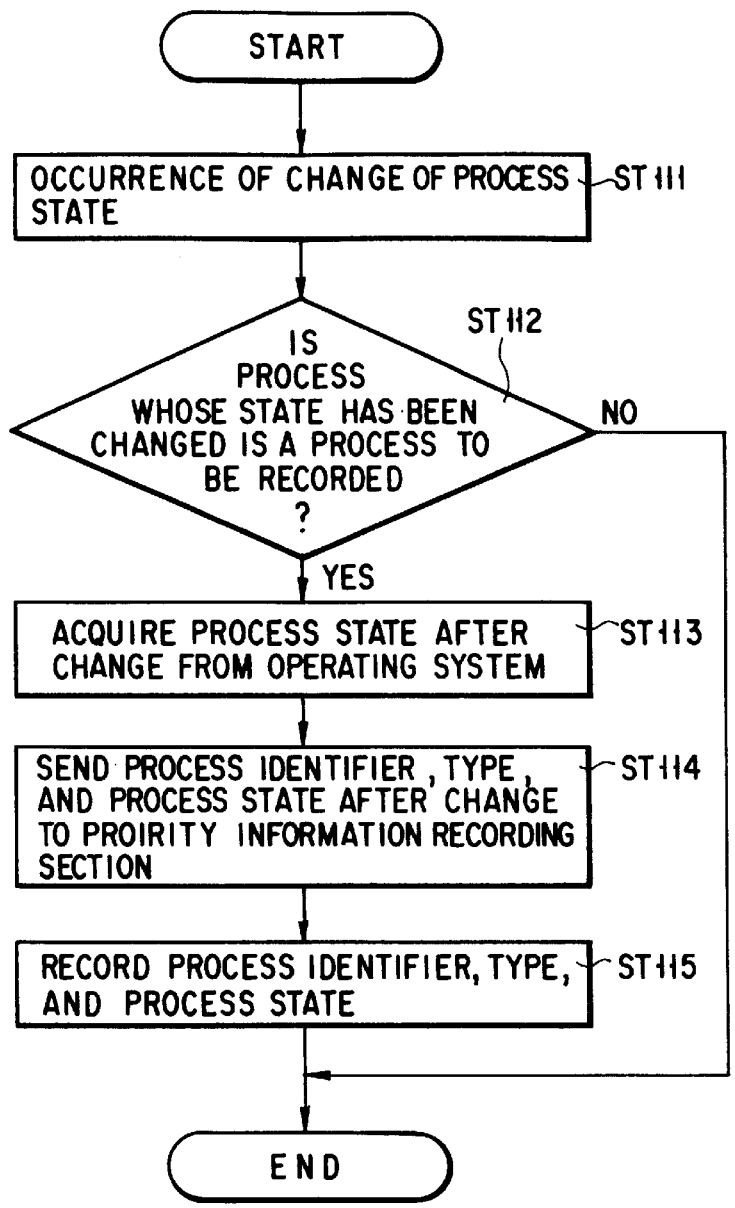
FIG. 11 is a flowchart of the process at the time when the process state has changed.
FIG. 12 shows an example of the pieces of priority information (process state) recorded by the priority information recording section 4.

FIG. 11 is a flowchart to help explain the flow of processing in a case where the change of the process state has taken place.

When the change of the process state has occurred during the execution of the application program (ST111), the priority information acquisition section 3 judges whether or not the process for which the change of the process state has occurred is a process to be recorded (ST112). When having judged that the process for which the change of the process state has occurred is a process to be recorded, the priority information acquisition section 3 acquires the process state after the change from the operating system (ST113) and sends it together with the process identifier and the type of information (process state change) to the priority information recording section 4 (ST114). The priority information recording section 4 records these pieces of information as information on the process state (ST115).

FIG. 12 illustrates an example of pieces of information on the process state recorded by the priority recording section 3. The figure shows that the change of the process state has taken place for process B and that the state of process B after the change is "Ready," and the cause of the change has come from Scheduler.

As described above, when the occurrence of priority inheritance, the cancellation of priority inheritance, the change of the basic priority, or the change of the process state has been occurred, the priority information recording section 4 manages these events by unique numbers. Then, the information necessary for displaying the priority information is read out at the request of the priority information display section 3.

FIG. 13 shows a list of pieces of priority information classified by process information No.

In the figure, process No. 1 to No. 6 are pieces of process initial information. The figure shows that immediately before No. 7, the application program has been started and process B has been executed as a result of the scheduling of the operating system 1. Thereafter, although not shown in the process information, process B is assumed to have acquired semaphore A.

Process information No. 8 shows that process B has issued a system call that changes the process state of process A and has brought process A into "Ready" state. As a result, the operating system 1 performs scheduling.

Process information No. 9 and No. 10 show that as a result of scheduling, process A has been selected, process B has gone into "Ready" state, and process A has gone into "Run" state.

Process information No. 11 shows that process C has issued a system call that changes the basic priority of process B and the priority of process B has taken the value of 6.

Process information No. 12 shows that process A has failed to acquire semaphore A that process B has and has gone into "Wait" state.

Process information No. 13 shows that process B has inherited priority 3 of process A because process A has waited for semaphore A.

Process information No. 14 shows that as a result of scheduling, process B has gone into "Run" state.

Process information No. 15 shows that as a result of the return of semaphore A, the inherited priority has been canceled.

Process information No. 16 shows that as a result of the return of the semaphore, process A has gone into "Ready" state.

Process information No. 17 and No. 18 show that as a result of scheduling, process A has gone into "Run" state.

As explained so far, with the embodiment, when specific events concerning the priorities and states of processes have taken place, pieces of specific priority information on the events can be acquired and displayed in list form. More specifically, in debugging a concurrent program, information on the priorities of processes to be debugged, including inheritance, cancellation, and basic priority change, can be recorded as a history and displayed in list form.

Therefore, with the embodiment, because the behavior of processes in the concurrent program, the change of priority, the cause of priority change, etc. can be recorded and displayed in list form for the user to understand it easily, the user can easily find bugs in the application program resulting from priority inheritance caused by an unexpected behavior of the process. This enables efficient debugging, improving the efficiency of the debugging work.

(Second Embodiment)

Hereinafter, a second embodiment of the present invention will be explained. The second embodiment relates to a three-dimensional display of process information including the priority information obtained in the first embodiment.

In this embodiment, the process information including priority information is expressed by three-dimensional coordinates using three coordinate axes consisting of time (t), process (n), and priority (p). In this case, the coordinate system (t, n, p) is referred to as W. For example, when there are three processes (A, B, C) to be displayed, it is assumed that the n-coordinate of process A is 1, the n-coordinate of process B is 2, and the n-coordinate of process C is 3. When the priority of a process to be displayed is P, the p-coordinate is assumed to be [−P]. The reason for this is that the present embodiment is intended for a system where the value of the priority of a process whose priority is high is smaller than that of the priority of a process whose priority is low. At time T when an event to be displayed has occurred, the t-coordinate is determined to be T. A three-dimensional coordinate system (x, y, z) for output is determined to be D.

As shown in FIG. 14, the priority information display system of the present embodiment comprises an input section 100, a process information analyzing section 101, a coordinate transformation section 102, and an output section 103. Although not shown, the process information analyzing section 101 is connected to the priority information storage section 4 explained in the first embodiment and gets the process information including priority information from the storage section 4.

The user uses an input section 100 to specify a process to be displayed, a coordinate shift of r, and a rotational angle of a. The process information analyzing section 101 reads the process information on the process to be displayed from all of the process information and creates the W-coordinate information. On the basis of the coordinate shift r and rotational angle $\alpha$, the coordinate transformation section 102 transforms the W-coordinate information created by the process information analyzing section 101 into the D-coordinate information to be outputted from the output section 103. The output section 103 creates three-dimensional display information from the D-coordinate information and outputs it.

A series of operations in the display processing in the present embodiment thus constructed will be described. Explanation will proceed taking a case where the user has specified (0, 0, 0) for the coordinate shift r and 0 for the rotational angle $\alpha$.

The process information analyzing semiconductor 101 reads pieces of process information to be displayed (No. 1 to No. 17) from the priority information storage section 4 and gets the W-coordinate information as described below.

Reads in process information No. 1 that the initial state of process A is "Wait." From this time on, the state of process A is stored as "Wait" until it has been changed.

Reads in process information No. 2 that the initial state of process B is "Ready." From this time on, the state of process B is stored as "Ready" until it has been changed.

Reads in process information No. 3 that the initial state of process C is "Ready." From this time on, the state of process C is stored as "Ready" until it has been changed.

Reads in process information No. 4 that the initial basic priority of process A (n=1) is 3 (p=3). Because the process is in the initial state, time t=0 is set and W-coordinate information No. 1 "(0, 1, −3), state Wait" is obtained.

Reads in process information No. 5 that the initial basic priority of process B (n=2) is 4 (p=4). Because the process is in the initial state, time t=0 is set and W-coordinate information No. 2 "(0, 2, −4), state Ready" is obtained.

Reads in process information No. 6 that the initial basic priority of process C (n=3) is 5 (p=5). Because the process is in the initial state, time t=0 is set and W-coordinate information No. 3 "(0, 3, −5), state Ready" is obtained.

Reads in process information No. 7 that process B (n=2) has changed the state to Run. W-coordinate information No. 4 "(0, 2, −4), state Run" is obtained.

Reads in process information No. 8 that process B has caused process A (n=1) to change the state to Ready. Because the first event has occurred, time t=1 is set and W-coordinate information No. 5 "(1, 1, −3), state Ready, state change causing process B" is obtained. Furthermore, W-coordinate information No. 6 "(1, 2, −4), process A state change" is obtained.

Reads in process information No. 9 that process B (n=2) has changed the state to Ready. W-coordinate information No. 7 "(1, 2, −4), state Ready" is obtained.

Reads in process information No. 10 that process A (n=1) has changed the state to Run. W-coordinate information No. 8 "(1, 1, −3), state Run" is obtained.

Reads in process information No. 11 that process A has caused process B (n=2) to change the basic priority to 6. Because the second event has occurred, time t=2 is set and W-coordinate information No. 9 "(2, 2, −3), state Ready" and W-coordinate information No. 10 "(2, 2, −6), state Ready, priority change causing process A" are obtained. Furthermore, W-coordinate information No. 11 "(2, 1, −3), priority-changed process B is obtained.

Reads in process information No. 12 that semaphore A has caused process A (n=1) to change the state to Wait. Because the third event has occurred, time t=3 is set and W-coordinate information No. 12 "(3, 1, −3), state Wait, causal semaphore A" is obtained.

Reads in process information No. 13 that process A has caused process B (n=2) to inherit the priority. W-coordinate information No. 13 before inheritance of the value of the priority "(3, 2, −6), state Ready, before priority inheritance" and W-coordinate information No. 14 "(3, 2, −3), state Ready; process A priority inheritance" are obtained. From this time on, the priority inheritance state of process A and the before-inheritance priority 6 are stored as the priority state of process B.

Reads in process information No. 14 that process B (n=2) has changed the state to Run. W-coordinate information No. 15 "(3, 2, −3), state Run" is obtained.

Reads in process information No. 15 that semaphore A has caused process B (n=2) to cancel the inheritance of the priority. Because the fourth event has occurred, time t=4 is set and W-coordinate information No. 16 before the change of the priority value "(4, 2, −3), state Run, before cancellation of semaphore A priority inheritance" and W-coordinate No. 17 "(4, 2, −6), state Run, cancellation of semaphore A priority inheritance" are obtained.

As a result of the above-described processes, the following W-coordinate information is obtained. W-coordinate information No. 1: process A, (0, 1, −3), state Wait W-coordinate information No. 2: process B, (0, 2, −4), state Ready W-coordinate information No. 3: process C, (0, 3, −5), state Ready W-coordinate information No. 4: process B, (0, 2, −4), state Run W-coordinate information No. 5: process A, (1, 1, −3), state Ready, causal process B W-coordinate information No. 6: process B, (1, 2, −4), process A state change W-coordinate information No. 7: process B, (1, 2, −4), state Ready W-coordinate information No. 8: process A, (1, 1, −3), state Run W-coordinate information No. 9: process B, (2, 2, −3), state Ready W-coordinate information No. 10: process B, (2, 2, −6), state Ready, priority change causing process A W-coordinate information No. 11: process A, (2, 1, −3), priority-changed process B W-coordinate information No. 12: process A, (3, 1, −3), state Wait, causal semaphore A W-coordinate information No. 13: process B, (3, 2, −6), state Ready, before priority inheritance W-coordinate information No. 14: process B, (3, 2, −3), state Ready, process A priority inheritance W-coordinate information No. 15: process B, (3, 2, −3), state Run W-coordinate information No. 16: process B, (4, 2, −3), state Run, before cancellation of semaphore A priority inheritance W-coordinate information No. 17: process B, (4, 2, −6), state Run, cancellation of semaphore A priority inheritance Then, according to the rotational operation $R\alpha$ on the basis of the coordinate shift r and the rotational angle $\alpha$, the coordinate transformation section 102 transforms the W-coordinate information created at the process information analyzing section 101 into D-coordinate information to display the data on the output section 103. In the embodiment, it is assumed that the D-coordinate system has the same origin of (0, 0, 0) as that of the W-coordinate system and is a three-dimensional coordinate system using (−1, 1, 0) as an x-axis vector, (−1, −1, 2) as a y-axis vector, and (1, 1, 1) as a z-axis vector.

A transformation matrix WD from the W-coordinate system into the D-coordinate system is expressed by the following equation (1):

$$\begin{bmatrix} -\frac{1}{\sqrt{2}} & -\frac{1}{\sqrt{6}} & \frac{1}{\sqrt{3}} \\ \frac{1}{\sqrt{2}} & -\frac{1}{\sqrt{6}} & \frac{1}{\sqrt{3}} \\ 0 & \frac{2}{\sqrt{6}} & \frac{1}{\sqrt{3}} \end{bmatrix}^{-1}$$

The coordinate transformation section 102 transforms point w on the W-coordinate system into point d on the D-coordinate system using the following equation (2):

$$d = WDR\alpha w + r \qquad (2)$$

Hereinafter, the coordinate obtained by transforming coordinate wx in W-coordinate information No. x is expressed as dx. As a result of the transformation, the following pieces of information are obtained:

D-coordinate information No. 1: process A, d1, state Wait
D-coordinate information No. 2: process B, d2, state Ready
D-coordinate information No. 3: process C, d3, state Ready
D-coordinate information No. 4: process B, d4, state Run
D-coordinate information No. 5: process A, d5, state Ready, causal process B
D-coordinate information No. 6: process B, d6, process A state change
D-coordinate information No. 7: process B, d7, state Ready
D-coordinate information No. 8: process A, d8, state Run
D-coordinate information No. 9: process B, d9, state Ready
D-coordinate information No. 10: process B, d10, state Ready, priority change causing process A
D-coordinate information No. 11: process A, d11, priority changed process B
D-coordinate information No. 12: process A, d12, state Wait, causal semaphore A
D-coordinate information No. 13: process B, d13, state Ready, before priority inheritance
D-coordinate information No. 14: process B, d14, state Ready, process A priority inheritance
D-coordinate information No. 15: process B, d15, state Run
D-coordinate information No. 16: process B, d16, state Run, before cancellation of semaphore A priority inheritance
D-coordinate information No. 17: process B, d17, state Run, cancellation of semaphore A priority inheritance Then, the output section 103 projects the d-coordinate information on the z=0 plane in parallel with the z-axis.

Here, processing is effected by the type of process as described below.

D-coordinate information No. 1: process A, d1, state Wait
D-coordinate information No. 5: process A, d5, state Ready, causal process B D-coordinate information No. 8: process A, d8, state Run
D-coordinate information No. 11: process A, d11, priority changed process B
D-coordinate information No. 12: process A, d12, state Wait, causal semaphore A
D-coordinate information No. 2: process B, d2, state Ready
D-coordinate information No. 4: process B, d4, state Run
D-coordinate information No. 6: process B, d6, process A state change
D-coordinate information No. 7: process B, d7, state Ready
D-coordinate information No. 9: process B, d9, state Ready
D-coordinate information No. 10: process B, d10, state Ready, priority change causing process A
D-coordinate information No. 13: process B, d13, state Ready, before priority inheritance
D-coordinate information No. 14: process B, d14, state Ready, process A priority inheritance
D-coordinate information No. 15: process B, d15, state Run
D-coordinate information No. 16: process B, d16, state Run, before cancellation of semaphore A priority inheritance
D-coordinate information No. 17: process B, d17, state Run, cancellation of semaphore A priority inheritance
D-coordinate information No. 3: process C, d3, state Ready According to the D-coordinate information created by the above-mentioned processes, a three-dimensional image of the priority information is outputted. Hereinafter, the procedure for creating (outputting) the three-dimensional image will be described.

First, the processing concerning process A is done as follows:

According to information No. 1, "process A" and priority value "3" are outputted to d1.

According to information No. 1 and No. 5, a line representing Wait is outputted in the range from d1 to d5.

According to information No. 5 and No. 8, a line representing Ready (which takes the form of a dotted line) is outputted in the range from d5 to d8.

According to information No. 8 and No. 12, a line representing Run is outputted in the range from d6 to d5.

According to information No. 5 and No. 6, a line representing process control is outputted in the range from d6 to d5.

According to information No. 12, "semaphore A" is outputted to d12.

Then, the processing concerning process B is effected as described below.

According to information No. 2, "process B" and the priority value 141 are outputted to d2.

According to information No. 2 and No. 4, a line representing Ready (which takes the form of a dotted line) is outputted in the range from d2 to d4.

According to information No. 4 and No. 7, a line representing Run is outputted in the range from d4 to d7.

According to information No. 7 and No. 9, a line representing Ready is outputted in the range from d7 to d9.

According to information No. 9 and No. 10, a line representing Ready is outputted in the range from d9 to d10.

According to information No. 10 and No. 13, a line representing Ready is outputted in the range from d10 to d13.

According to information No. 13 and No. 14, a line representing priority is outputted in the range from d13 to d14.

According to information No. 14 and No. 15, a line representing Run is outputted in the range from d14 to d15.

According to information No. 15 and No. 16, a line representing Run is outputted in the range from d15 to d16.

According to information No. 15 and No. 16, a line representing priority is outputted in the range from d16 to d17.

According to information No. 10, the priority value "6" is outputted to d10.

Although according to information No. 5 and No. 6, a line representing process control can be outputted in the range from d6 to d5, the line will not be outputted because the line has already been outputted in the processing concerting process A.

According to information No. 14 and No. 12, a line representing priority inheritance is outputted in the range from d14 to d12.

Then, the processing concerning process C is performed. Specifically, in the processing, according to information No. 3, "process C" and the priority value "5" are outputted to d3.

Figure 15:
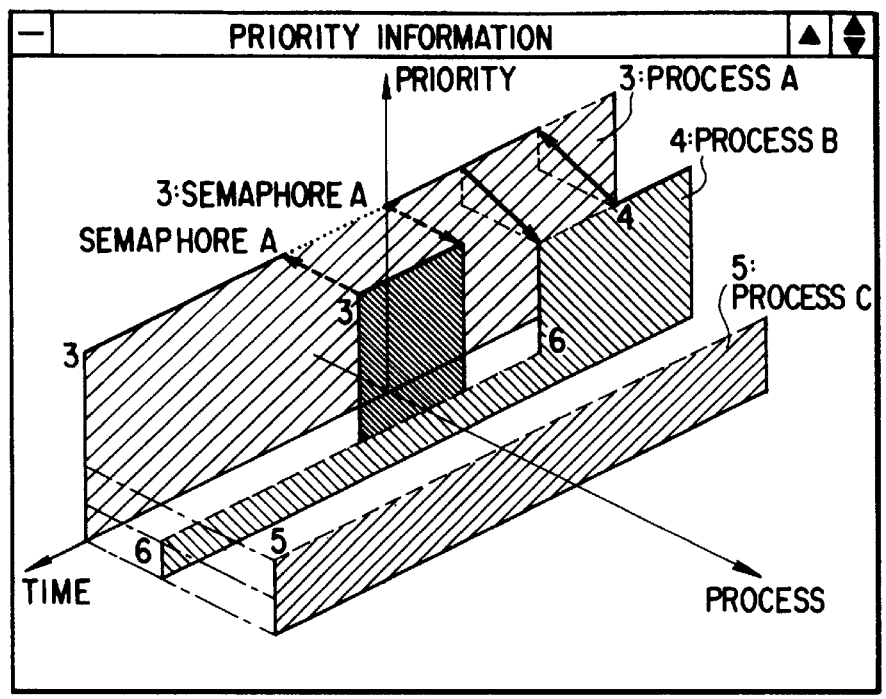
FIG. 15 illustrates an example of a three-dimensional display of priority information.

As described above, the priority information display system of the second embodiment produces a three-dimensional image of priority information as shown in FIG. 15. In FIG. 15 (−3, −1, 7) is specified for the coordinate shift r by the user. The image enables the user to intuitively grasp the information on the process changing with time, including priority inheritance, cancellation, and process state change. In FIG. 15, a bold line represents the Run state of the process, a fine broken line represents the Ready state, and a denser fine broken line represents the Wait state. A broken-line arrow represents priority inheritance and a bold-line arrow represents process control. To make it easier to grasp the priority inheritance state, colored representation (hatching representation) is used. For instance, in the case of process B, it can be seen easily from the dense hatching that process B is in the priority inheritance state during the period of time during which the priority value remains at 3 (during the same period, the basic priority value remains at 6).

Figure 16:
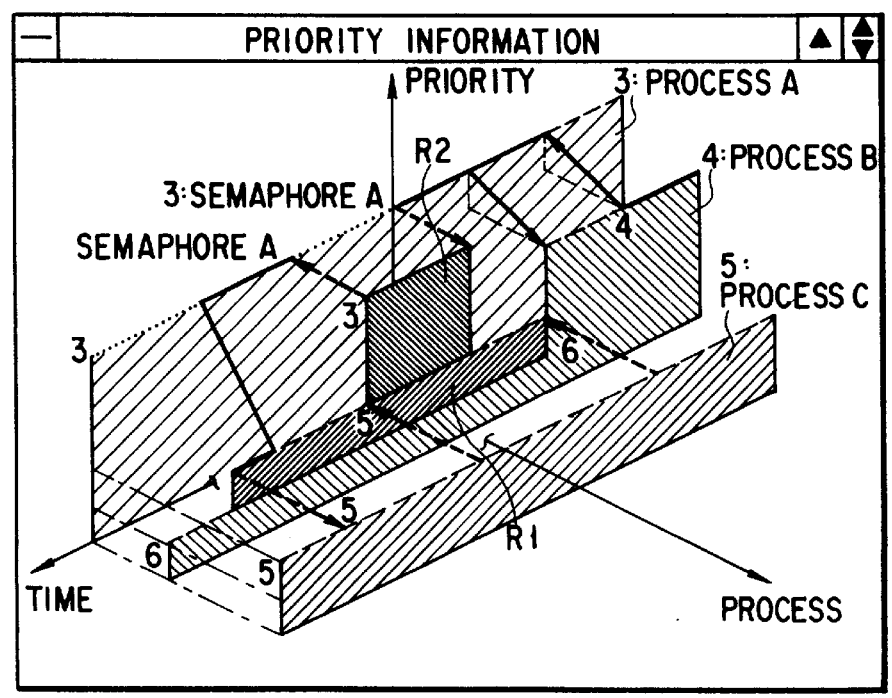
FIG. 16 illustrates another example of a three-dimensional display of priority information.

While in the above-described example, priority inheritance has taken place between process A and process B, a single process may inherit the priorities from a plurality of processes. FIG. 16 illustrates an example of display in such a case. As shown in the figure, the region indicated by R1 represents the state of priority inheritance from process C (a priority value of 5), and the region indicated by R2 represents the state of priority inheritance from process B (a priority value of 3). The R1 and R2 are hatched (colored) differently from each other, which enables the user to grasp the detailed information on priority inheritance.

As described until now, with the present invention, when a specific event related to the priorities of processes has taken place, not only specific process information on the event can be acquired and displayed in list form, but also the behavior of processes in a concurrent program, the change of priority, the cause of priority change, etc. can be recorded and displayed in list form to the user, so that the user can easily find bugs or the like in the application program stemming from priority inheritance caused by an unexpected behavior of the process. Therefore, it is possible to provide a priority information display system that displays the program information effective in debugging the concurrent program.

Furthermore, with the present invention, it is possible to provide a priority information display system that displays the priority information three-dimensionally to offer the user more effective priority information.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A priority information display system which operates with an operating system that controls an execution of a plurality of processes according to their respective priorities and permits an inheritance of priority between said processes, said priority information display system comprising:

a section configured to detect a priority inheritance event occurring in said operating system;

an acquisition section configured to acquire from said operating system, inheritance information relating to the inheritance of priority which corresponds to the priority inheritance event; and a display section configured to generate, based on the acquired inheritance information, display information which includes a three-dimensional line showing the inheritance of priority between the processes.

2. A priority information display system according to claim 1, further comprising a specifying section configured to specify one of said plurality of processes as a process to be recorded, wherein said acquisition section acquires inheritance information for the specified process.

3. A priority information display system according to claim 1, wherein said acquisition section further acquires an identifier of a process from which a priority is inherited.

4. A priority information display system according to claim 1, wherein said acquisition section further acquires information on a cause of priority cancellation according to said priority inheritance event.

5. A priority information display system according to claim 1, further comprising a section configured to acquire information on the change of a basic priority of a process as part of the inheritance information.

6. A priority information display system according to claim 1, further comprising a section configured to acquire information on the change of a state of a process as information.

7. A priority information display system according to claim 1, wherein said display section includes a section configured to display said inheritance information three-dimensionally with respect to a time axis, a priority value axis, and a process type axis.

8. A priority information display system which operates with an operating system that controls an execution of a plurality of processes according to their respective priorities and permits an inheritance of priority between said processes, said priority information display system comprising:

a section configured to detect a priority inheritance event occurring in said operating system;

an acquisition section configured to acquire, from said operating system, inheritance information relating to the inheritance of priority which corresponds to the priority inheritance event;

a coordinate information creation section configured to create, based on said acquired inheritance information, coordinate information on a coordinate system including a time axis, a process type axis, and a priority value axis;

a coordinate information transformation section configured to transform said coordinate information into coordinate information on a three-dimensional display; and a display section configured to display three-dimensional lines representing the priorities of the processes and the inheritance of priority three-dimensionally according to the transformed coordinate information on the three-dimensional display.

9. A priority information display method with an operating system that controls an execution of a plurality of processes according to their respective priorities and permits the inheritance of priority between said processes, said priority information display method comprising:

detecting a priority inheritance event occurring in said operating system;

acquiring from said operating system inheritance information relating to the inheritance of priority which corresponds to the priority inheritance event; and generating, based on the acquired inheritance information, display information which includes a three-dimensional line showing priority inheritances between the processes.

10. A priority information display method according to claim 9, further comprising specifying one of said plurality of processes as a process to be recorded, wherein acquiring inheritance information includes acquiring said priority information for the process to be recorded.

11. A priority information display method according to claim 9, wherein acquiring inheritance information includes:

sensing an event related to the inheritance of priority; and acquiring a priority of inheritance from another process and an identifier of the process from which the priority is inherited, according to said event sensing.

12. A priority information display method according to claim 9, wherein acquiring inheritance information includes:

sensing an event related to the cancellation of priority inheritance; and acquiring information on the cause of priority cancellation according to said event sensing.

13. A priority information display method according to claim 9, further comprising acquiring information on the change of the basic priority of a process as information included in said inheritance information.

14. A priority information display method according to claim 9, further comprising acquiring information on the change of the state of a process as information included in said inheritance information.

15. A priority information display method according to claim 9, wherein generating display information includes displaying said inheritance information three-dimensionally together with coordinate axes including two time axes and a priority value axis.

16. A priority information display method according to claim 9, wherein generating display information includes displaying said inheritance information three-dimensionally together with a time axis, a priority value axis, and a process type axis.

17. A priority information display method for use with an operating system that controls execution of a plurality of processes having respective priorities and that enables the inheritance of priority between processes, said priority information display method comprising:

acquiring, from said operating system, priority information including information on the inheritance of process priorities;

creating, on the basis of the acquired inheritance information, coordinate information of said process priorities on a coordinate system including a time axis, a process type axis, and a priority value axis;

transforming the coordinate information created into coordinate information on a three-dimensional display coordinate system; and three-dimensionally displaying lines representing process priorities and an inheritance of priority according to the coordinate information on the three-dimensional display coordinate system.

18. A computer-readable medium having computer-executable instructions for performing, in association with an operating system that controls a plurality of processes having respective priorities and permits priority inheritance between processes, steps comprising:

detecting a priority inheritance event occurring in said operating system:

acquiring from said operating system inheritance information relating to the inheritance of priority which corresponds to the priority inheritance event;

displaying the acquired inheritance information; and generating, based on the acquired inheritance information, display information which includes a three-dimensional line representing the inheritance of priority between the processes.

* * * * *

UNITED STATES PATENT AND TRADEMARK OFFICE
CERTIFICATE OF CORRECTION

PATENT NO. : 6,301,602 B1
DATED : October 9, 2001
INVENTOR(S) : Katsuhiko Ueki

It is certified that error appears in the above-identified patent and that said Letters Patent is hereby corrected as shown below:

<u>Title page,</u>
Item [56], References Cited, U.S. PATENT DOCUMENTS, -- 5,158,686 -- has been replaced with -- 5,159,686 --.

Signed and Sealed this

Eighth Day of October, 2002

*Attest:*

*Attesting Officer*

JAMES E. ROGAN
*Director of the United States Patent and Trademark Office*